April 29, 1941.  G. H. HUNT  2,239,916

VEHICLE BRAKE

Filed June 26, 1939  3 Sheets-Sheet 1

INVENTOR.
GEORGE H. HUNT
BY
Carroll R. Taber
ATTORNEY.

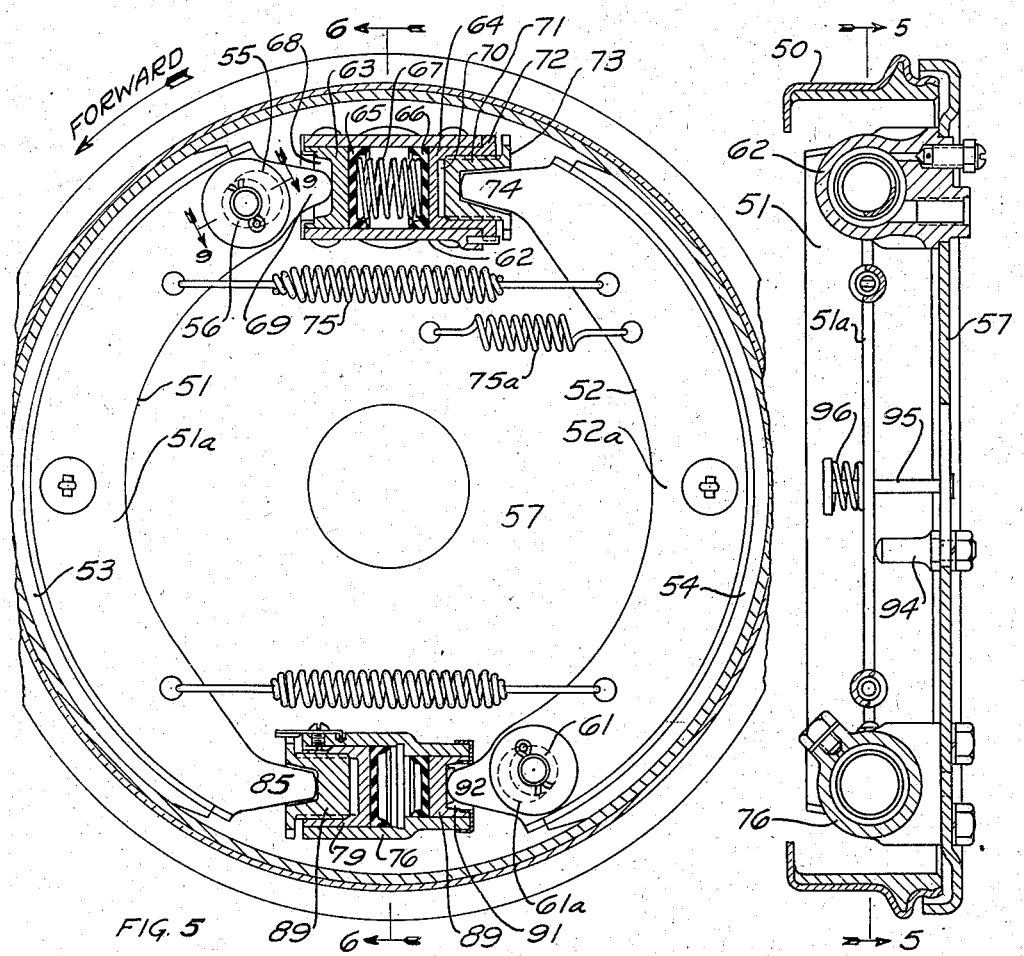
FIG. 5
FIG. 6
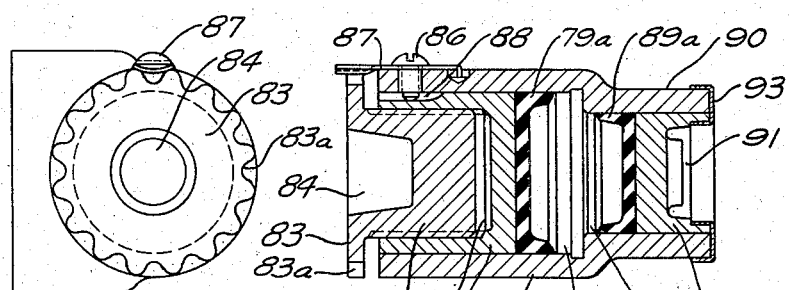
FIG. 7
FIG. 8
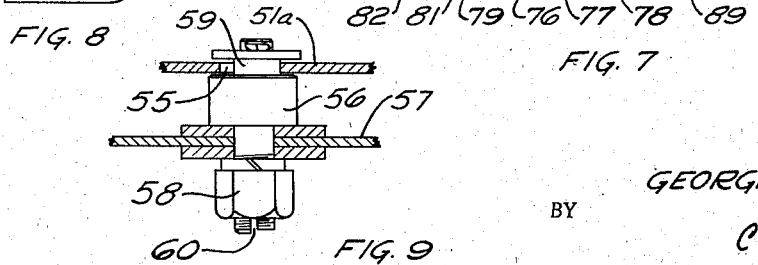
FIG. 9

April 29, 1941.    G. H. HUNT    2,239,916
VEHICLE BRAKE
Filed June 26, 1939    3 Sheets-Sheet 3

INVENTOR.
GEORGE H. HUNT
BY Carroll R. Taber
ATTORNEY.

Patented Apr. 29, 1941

2,239,916

UNITED STATES PATENT OFFICE 2,239,916

VEHICLE BRAKE

George H. Hunt, Lansing, Mich., assignor to Motor Wheel Corporation, Lansing, Mich., a corporation of Michigan Application June 26, 1939, Serial No. 281,111

7 Claims. (Cl. 188—78)

This invention relates to brakes for vehicle wheels, and particularly to brakes of the type in which one shoe exerts a servo action on the other shoe.

Vehicle brakes of the type defined above usually comprise a pair of semi-cylindrical brake shoes which are arranged to float slightly in a circumferential direction relative to the backing plate, and have their ends opposite the operating mechanism connected together in such a manner that a part of the force exerted by the rotating brake drum is picked up by one (primary) shoe and applied through the aforesaid connection to the other (secondary) shoe. This effect is commonly called a servo action. The total braking effect of the two shoes is thus increased many times over what it would be if there were no such servo action.

The advantage, that is, the increased braking effect of the ordinary brake of this type is to a large extent offset by several disadvantages. These disadvantages are the greater wear on the secondary shoe than on the primary shoe; the necessity for providing different kinds of linings on the two shoes; and the unequal distortion of the drum when the brakes are applied.

The first of these disadvantages, that is, the increased wear on the secondary shoe, is due to the fact that the pressure on the secondary shoe is several times greater than that of the primary shoe, and as a result, the increased friction between the secondary shoe and the drum causes the lining of the secondary shoe to wear out prematurely.

Another disadvantage inherent in the ordinary servo brake is that if the linings of the two shoes have the same coefficient of friction, and this is of normal value, then the brake tends to become erratic and difficult to control on account of the high ratio of servo effect relative to pedal pressure. To avoid this and give satisfactory effectiveness and control it has been necessary to use a lining on the secondary shoe which has a much lower coefficient of friction than that of the primary shoe.

The third disadvantage listed above is that of distortion of the drum when the brake shoes are actuated. This is due to the fact that the pressure on the secondary shoe being greater than that on the primary shoe, there is a tendency to force the drum to one side of its normal center and cause it to become oval or eccentric.

The present invention has for its primary objects the overcoming of the aforementioned disadvantages. In its broadest aspects the invention consists of a novel brake shoe servo control device which is interposed between the ends of the brake shoes opposite the brake actuating mechanism and so constructed that only a definite portion of the effort of the primary brake shoe is transmitted to the secondary shoe. The rest of the effort is applied to the brake backing plate and has no effect on the brake shoes or brake drum. The advantages of this structure lie in the equalization of the wear of the brake shoes; the substantial elimination of unequal drum distortion; the possibility of using brake linings on both shoes having the same coefficient of friction; and the decrease of movement of the brake operating pedal required to take up the slack in the system.

Other objects of the invention will become apparent in the following specification when read in connection with the accompanying drawings, in which—

Figure 5 is a cross-sectional view of a modified form of the invention taken on substantially the line 5—5 of Figure 6;

Figure 6 is a cross-sectional view of the brake shown in Figure 5 taken on substantially the line 6—6 of Figure 5;

Figure 7 is an enlarged cross-sectional view of the servo control shown in Figure 5, but on an enlarged scale;

Figure 8 is an enlarged end elevation of the control shown in Figure 7;

Figure 9 is a cross-sectional view of the brake adjusting mechanism taken on substantially the line 9—9 of Figure 5;

Figure 1:
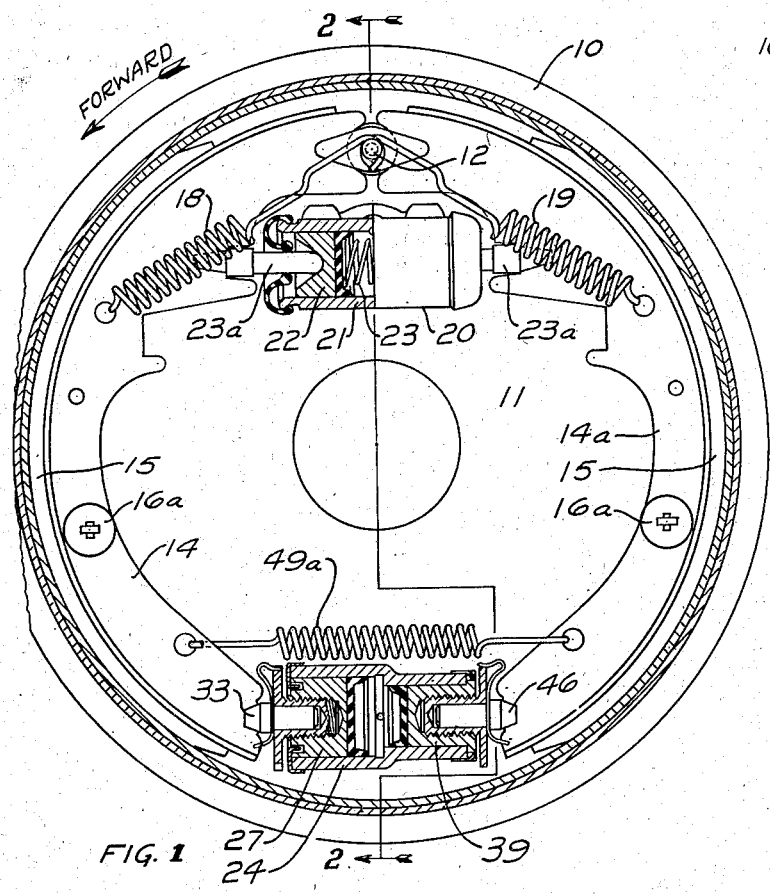
Figure 1 is a cross-sectional view of a complete brake assembly taken on substantially the line 1—1 of Figure 2.
Figure 2:
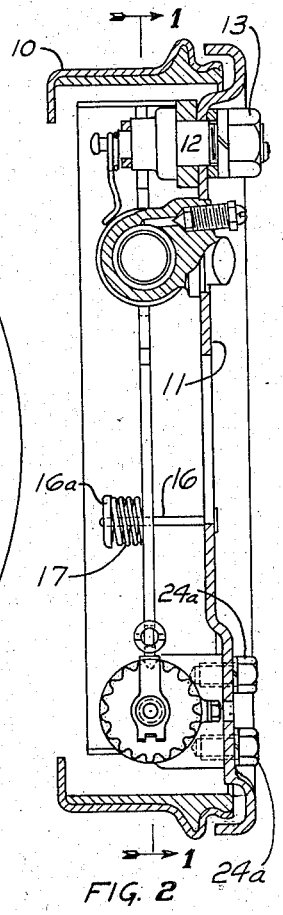
Figure 2 is a cross-sectional view taken on substantially the line 2—2 of Figure 1.
Figures 3, 4:
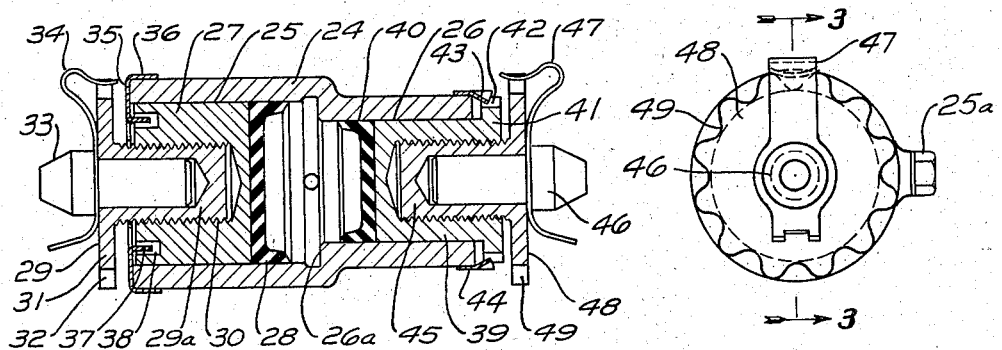
Figure 3 is a cross-sectional view of the servo control device shown in Figure 1, but on a larger scale and shown in braking position.
Figure 4 is an end elevational view of the control device shown in Figure 3.
Figure 10:
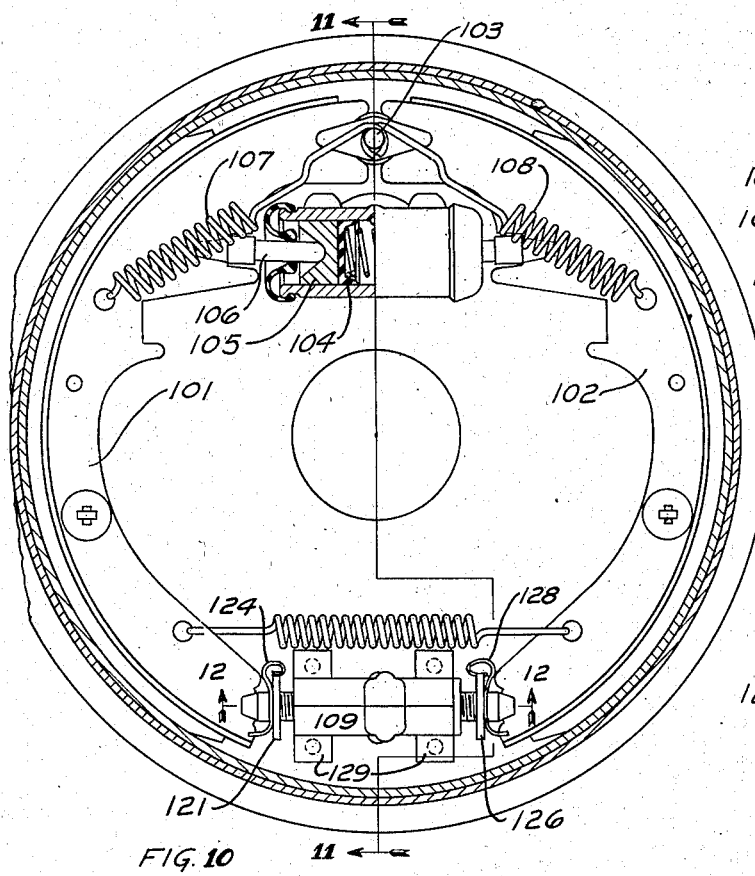
Figure 10 is a sectional view of a still further modified form of the invention taken on substantially the line 10—10 of Figure 11.
Figure 11:
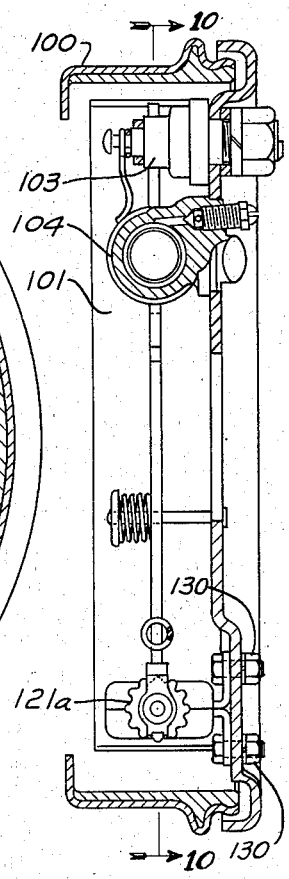
Figure 11 is a cross-sectional view taken on substantially the line 11—11 of Figure 10.

Referring more specifically to the drawings, and particularly to Figures 1 to 4, there is shown a complete wheel brake mechanism which comprises a conventional brake drum 10 having a backing plate 11. Adjacent the periphery of the backing plate is an anchor pin 12 which is secured thereto by means of a nut 13. A pair of semi-cylindrical shoes 14 and 14a, which are provided with any suitable brake lining 15, are mounted on the backing plate 11 within the brake drum 10. The upper adjacent ends of the brake shoes are recessed to receive and bear against the opposite sides of the anchor pin 12. Normally the adjacent ends of the brake shoes 14 and 14a are held against the anchor pin by means of a pair of coiled springs 18 and 19. These springs 18 and 19 are secured at their adjacent ends to the anchor pin and at their remote ends to the respective brake shoes. Preferably spring 18 is weaker than spring 19, or is under slightly less tension.

The shoes 14 and 14a are T-shaped in cross-section. Pins 16 pass through the backing plate 11 and the flanges of the brake shoes 14 and 14a and are provided with washers 16a at their inner ends. Located between the flanges of the brake shoes and the washers 16a are compression springs 17 which hold the shoes 14 and 14a against the backing plate 11.

Located below the anchor pin 12 and rigidly secured to the backing plate is the brake operating mechanism. This mechanism is a conventional hydraulic device comprising a wheel cylinder 21 secured to the backing plate 11 by any suitable means. Slidable within the cylinder 21 is a pair of opposed pistons 22. The latter are held in spaced relation by a coiled spring 23. The remote ends of the pistons receive a pair of struts 23a, the remote ends of which are bifurcated to receive the radial flanges of the shoes 14 and 14a in a manner well known in the art. The wheel cylinder 21 has an inlet at one side thereof which is connected by a suitable conduit to a master cylinder, not shown, of the brake system, in order that hydraulic fluid may be forced into the wheel cylinder to operate the brakes.

Secured to the backing plate 11 by bolts 24a at a point directly opposite the anchor pin and operating mechanism is a brake servo control, which constitutes the heart of this invention. It includes a housing 24 having two axially aligned cylinders 25 and 26 therein of different diameters. The cross-sectional area of the larger cylinder 25 is approximately 2¾ times that of the smaller cylinder 26, although the relative diameters of the two cylinders may be varied within reasonable limits. The housing 24 has an opening in one side by which it may be filled with brake fluid. This opening is ordinarily closed by a screw plug 26a.

Within the cylinder 25 is a plunger 27 which fits snugly yet slidably therein. The inner end of the plunger 27 is provided with a cup washer 28 of rubber or other material to prevent leakage past the plunger. An adjusting screw 29 having a stem 29a threaded into the recess 30 in the plunger, and a flanged head 31, is provided to compensate for brake shoe wear. The flanged head 31 is notched about its periphery as at 32 for a purpose which will appear presently.

A strut 33, bifurcated at its outer end, is seated within the recess in the brake adjusting screw and has rigidly secured to it a spring 34 which engages any one of the notches 32 in the periphery of the flanged head 31.

A dust cover 35 is fitted over the end of the housing 24 and is frictionally held thereon by means of a tight fitting peripheral flange 36. A plurality of integral tongues 37 are struck from the main body of the cover and are received in complementary recesses 38 in the plunger 27. The interlocking connection between the tongues 37 and recesses 38 prevents relative rotation of the plunger 27 and housing 24, and the cover itself excludes dirt and moisture from the interior of the housing.

The brake shoe 14, may be adjusted to compensate for wear of the lining 15 by turning the screw 29. The spring 34 yields to allow such rotation but prevents accidental turning of the screw.

Within the cylinder 26 is a plunger 39 having a radial flange 41 at its outer end which overlies and normally abuts the adjacent end of the housing 24. The flange 41 allows the plunger 39 to move axially to the right, as viewed in Figure 3, but prevents movement to the left from its normal position. The plunger 39 has a rubber cup washer 40 to prevent leakage of fluid. The flange 41 is notched at 42 to receive tongues 43 which are struck from an annular ring 44 frictionally engaging the housing. The ring 44 prevents rotation of the plunger 49.

An adjusting screw 45 having a flanged head 48 is threaded into a recess in the plunger 39 and receives a bifurcated strut 46 which is adapted to be connected to the flange of the brake shoe 14a. A spring 47 is attached to the strut 46 and engages notches 49 in the flanged head of the adjusting screw. This adjusting mechanism is identical with and its operation is the same as the adjusting mechanism previously described in connection with the plunger 27.

The portion of the housing 24 between the two plungers 27 and 39 is filled with brake operating fluid. However, there is no connection between the housing 24 and the brake applying system or any of the wheel cylinders. Fluid need be added only to replenish that which may be lost through accidental leakage.

The lower ends of the brake shoes 14 and 14a are biased toward each other at all times by a coiled spring 49a which is secured at its remote ends by the respective shoes. Due to the fact that the plungers 27 and 39 are of different diameters, the spring normally holds the flange 41 of the plunger 39 against the adjacent end of the housing, and thus in the position shown in Figure 1.

The operation of the structure described is as follows:

When the brake drum 10 is rotating in the direction shown by the arrow in Figure 1, and it is desired to stop the rotation of the same, the foot pedal of the brake system is depressed in the usual manner and fluid is forced from the master cylinder into the wheel cylinder 21, thereby tending to force the pistons 22 apart. Because the spring 18 is weaker than the spring 19, shoe 14 (which is the primary shoe when the drum is rotating in the direction of the arrow) will be pressed into contact with the brake drum, and there will be a tendency for the shoe 14 to move in the same direction as the drum, or counter-clockwise as viewed in Figure 1.

There is also a tendency for the shoe 14 to rock to the left about its connection with the 33 of the servo control. Thus, the brake shoe tends to dig into the brake drum 10, producing what is usually spoken of as a "wrapping" or "self-energizing" action. Thus, a greater force is exerted on the plunger 27 than would be produced from the action of the operator on the master cylinder alone. This pressure is then transmitted by the fluid in the servo control housing 24 to the smaller plunger 39, and thence to the secondary shoe 14a. Due to the fact that the plunger 39 is smaller than the plunger 27, only a portion of the force applied by the shoe 14 is transmitted to the shoe 14a. The rest of this force is transmitted to and absorbed by the shoulder 26a of the housing 24. As indicated above, the ratio of the force exerted by the shoe 14 to that applied to the shoe 14a is approximately 1 to 2¾. As soon as the shoe 14a is pressed into engagement with the drum 10, it will tend to rotate counter-clockwise, but this rotation is prevented by the engagement of the upper end of the shoe 14a with the anchor pin 12. Therefore, the shoe 14a has a "wrapping" or "self-energizing" action the same as shoe 14, but there is no servo action from shoe 14a to shoe 14.

When the brakes are released the springs 18, 19 and 49a return the parts to the initial position shown in Figure 1.

When the vehicle is reversing, or in other words, when the drum 10 is rotating in a clockwise direction, as viewed in Figure 1, brake shoe 14a will be pressed into engagement with the drum and will exert a "self-energizing" action the same as the shoe 14 when the drum is rotated in the other direction. However, the shoe 14a cannot exert servo action on shoe 14 because the flange 41 of the plunger 39 is in engagement with the adjacent end of the housing 24. Therefore, all the pressure on the shoe 14 is received from the actuating mechanism 20, and there is no "self-energizing" or servo action on the shoe 14. There will, of course, be some braking effect due to the friction between the lining on the shoe 14 and the brake drum 10. It will be evident that it is impracticable to apply a servo action from the brake shoe 14a to the shoe 14, because the pressure received from the shoe 14a would be multiplied through the differential plungers 39 and 27 rather than reduced, as in the previous case. Thus, the braking effect when the brake drum rotates clockwise is materially less than when it rotates counter-clockwise but is more than ample for braking in reverse.

It will be evident that the axial movement of the plunger 27 within the cylinder 25 when the brakes are applied is considerably less than the corresponding movement of the plunger 39. The fluid displacement from the wheel cylinder is accordingly less than in ordinary servo brakes and this conservation of displacement may be used to vary the pedal pressure or increase the pedal travel reserve.

Figures 5 to 9 show a slightly modified form of the invention. The servo control shown in this device is basically the same as that previously described, but is modified slightly because it is used in a somewhat different type of brake.

The brake shown in these figures comprises a brake drum 50 and a pair of brake shoes 51 and 52 having conventional linings 53 and 54. These shoes are both T-shaped in cross-section having flanges 51a and 52a respectively. The web 51a of brake shoe 51 has an oval opening 55 adjacent its upper end for the reception of an anchor pin 56. The latter is secured to a brake backing plate 57 by means of a nut 58. The inner end of the anchor pin 56 is reduced to form a stud 59 which is inserted in the opening 55. This stud 59 is offset slightly from the axis of the anchor pin 56 in order to form an eccentric. The other end of the anchor pin 56 is slotted at 60 to receive a screw driver or similar tool for turning the pin, whereby to adjust the upper end of the brake shoe initially. The other shoe 52 is secured in a similar manner to the backing plate 57 by means of an anchor pin 61 identical to the pin 56 but located diametrically opposite the pin 56, and received in an opening 61a in the flange 52a.

Intermediate the upper ends of the brake shoes is the brake operating mechanism. It consists of a wheel cylinder 62 rigidly attached to the backing plate 57 by any suitable means. The wheel cylinder is adapted to be connected by a suitable conduit, not shown, to the master cylinder of the brake system.

Within the wheel cylinder 62 is a pair of opposed plungers 63 and 64 provided with rubber cup washers 65 and 66, respectively, and biased apart by means of a coiled spring 67. Plunger 63 is recessed at 68 to receive a tongue 69 on the adjacent end of the brake shoe 51. Plunger 64 has a peripheral flange 72 at its outer end which normally abuts the end of the wheel cylinder 62 to prevent movement of the plunger from its inactive position toward the left or into the cylinder, as viewed in Figure 5. The plunger 64 has a recess which is threaded for the reception of the brake adjusting screw 71. The adjusting screw 71 has a notched peripheral flange 73 at its outer end whereby the screw may be turned to adjust the adjacent end of the brake shoe 52 to compensate for lining wear. The adjusting screw 71 has a recess to receive a tongue 74 on the adjacent end of the brake shoe 52.

A coiled spring 75 is connected at its remote ends to the respective flanges 51a and 52a of the brake shoes 51 and 52. This spring normally draws the adjacent ends of the brakes toward each other. A coiled spring 75a is secured at one end to the brake shoe 52 and at its other end to the backing plate 57. This spring tends to hold the brake 52 in its inoperative position even after the outward movement of the brake shoe 51 has commenced.

The servo control mechanism in this structure is located between the ends of the brake shoes opposite the wheel cylinder 62. It comprises a housing 76 having two axially aligned cylinders 77 and 78 of different diameters and is rigidly attached to the backing plate 57. The ratio of the cross-sectional areas of the cylinders 77 and 78 is approximately 2¾ to 1, as in the previously described modification of this invention.

Slidable within the cylinder 77 is a plunger 79 which carries a cup washer 79a of rubber or similar material to prevent leakage of fluid past the plunger. The plunger 79 is also provided with a threaded recess 81 for the reception of a threaded adjusting screw 82. The adjusting screw 82 has a peripheral flange 83 notched at 83a, and is recessed at 84 to receive a tongue 85 on the adjacent end of the brake shoe 51.

Secured to the housing 76 by means of a screw 86 is a spring 84 which engages the notches 83a in the adjusting screw 82 in order to prevent accidental rotation of the latter, yet allowing manual rotation thereof. Screw 86 extends completely through the side wall of the housing 76 and into a longitudinally extending groove 88 in the plunger 79 whereby to prevent rotation of the latter yet allow axial movement thereof.

The cylinder 78 slidably receives a plunger 89 having a cup washer 89a thereon. The plunger 89 is recessed at 91 to receive a tongue 92 on the adjacent end of the brake shoe 52. A thin metal dust cover 93 is secured to the plunger 89 to exclude dirt and moisture from the housing.

Both brake shoes 51 and 52 are held in properly spaced relationship to the backing plate 57 by a pair of guide pins 94 which are secured to the backing plate. A pair of pins 95 and coiled spring 96 hold the brake shoes against the guide pins 94.

The operation of this modification is as follows:

When fluid is forced into the wheel cylinder 62 from the master cylinder, the plunger 63 is pushed to the left as viewed in Figure 5 and acts on the tongue 69. As the oval opening in the flange 51a of the shoe 51 is considerably larger than the anchor pin 56, the brake shoe may move into contact with the rotating brake drum, and as soon as it touches the brake drum 10 there will be a "self-energizing" action, the same as that in the primary shoe of the previously described device. Shoe 51 will then rotate counter-clockwise, exerting a force on the plunger 79 which force is in part transmitted to the plunger 89 and to the adjacent end of the brake shoe 52.

The oval opening in the web 52a of the brake shoe 52 allows the latter to move slightly in a counter-clockwise direction and exert a force with "self-energizing" effect on the brake drum 50. The upper end of the shoe 52 is held against movement by the flange 72 of the plunger 64. It will thus be apparent that basically the operation of this brake is identical with that previously described. In other words, when the drum 10 operates counter-clockwise, brake shoe 51 is "self-energized" and exerts a servo action on brake shoe 52 and brake shoe 52 is then "self-energized" but does not exert any servo action on brake shoe 51.

When the drum rotates clockwise, brake shoe 52 is self-energized, but because of its contact with the anchor pin 61, no force is transmitted to the shoe 51. Neither is there any "self-energizing" action of the shoe 51.

The shoes are initially adjusted by loosening the nuts 58 and turning the anchor pins 56 and 61 to position the shoes in the drum. The positioning is done by eccentric 59 on pin 56 and a corresponding eccentric on pin 61. Clearance between the lining and the drum and adjustment for lining wear is obtained by rotating the adjusting screws 71 and 82 in the desired direction.

In Figures 10 to 14 is shown a still different embodiment of the invention. The basic difference between the construction shown in Figures 10 to 14 and that shown in Figures 1 to 4 lies in the fact that the servo control device is mechanical rather than hydraulic.

The general arrangement of the brake and its operating mechanism is identical with that shown in Figures 1 to 4. The brake construction comprises generally a brake drum 100, a pair of semi-cylindrical brake shoes 101 and 102, an anchor pin 103, and a hydraulic brake wheel cylinder 104. Within the cylinder is a pair of pistons 105 (only one of which is shown) which are forced apart by fluid introduced into the wheel cylinder from the master cylinder, not shown. The force exerted on the pistons 105 is transmitted to the brake shoes by means of a pair of struts 106, similar to struts 23a, previously described. The brake shoes are normally held against the anchor pin 103 by means of coiled springs 107 and 108.

Figure 12:
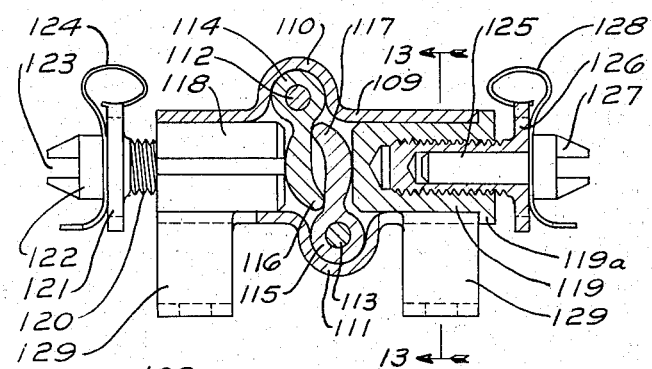
Figure 12 is a cross-sectional view of the servo control device shown in Figures 10 and 11 taken on substantially the line 12—12 of Figure 10.
Figure 13:
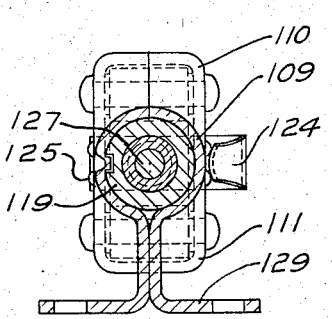
Figure 13 is a cross-sectional view of the control taken on substantially the line 13—13 of Figure 12.

The servo control mechanism is shown best in Figures 12 and 13. It consists of a housing 109, having a generally cylindrical bore extending longitudinally therethrough. Intermediate the ends of the housing 109 is a pair of recesses 110 and 111. Pivoted in these recesses on pivot pins 112 and 113, respectively, is a pair of short levers 114 and 115. These levers are of the cross-sectional shape shown best in Figure 12, and in their normal position the free ends 116 and 117 touch the body portions of the complementary lever.

Slidable within the bore of the housing 109 is a pair of plungers 118 and 119. These plungers are of generally cylindrical cross-section, but are provided along one side of each with a groove which is keyed to the interior of the housing 109 to prevent rotation thereof while allowing the plungers to slide axially of the housing. Normally, the adjacent ends of the plungers 118 and 119 contact the remote surfaces of the levers 114 and 115 respectively.

Threaded into a recess in the outer end of the plunger 118 is a brake adjusting screw 120, the outer end of which is flanged radially at 121. This flange 121 is provided with a plurality of peripheral notches 121a, as shown best in Figure 11. The brake adjusting screw 120 is provided with an axially extending recess in which a strut 122 is received. This strut is bifurcated at 123 to receive the adjacent end of the flange of the brake shoe 101. Non-rotatably attached to the strut 122 is a resilient spring 124 which yieldably bears against the outer periphery of the flange 121 and seats in any one of the various notches 121a about the circumference thereof.

The plunger 119 has a flange 119a at its outer end which abuts the adjacent end of housing 109 except when the plunger 119 has moved to the right. The plunger 119 is provided with a brake adjusting screw 125 having a flanged head 126 similar to the flange 121 of the other adjusting screw. The adjusting screw 125 is recessed to receive a strut 127 which receives the adjacent end of the brake shoe 102, and this strut 127 has associated with it a resilient spring 128.

The housing 109 has a support extending laterally from one side thereof in the form of a plurality of brackets 129 which are bolted to the backing plate by means of bolts 130.

In a general way the operation of the modification shown in Figures 10 to 14 is identical to that shown in Figures 1 to 4 except that, as above pointed out, the effort received from the primary brake shoe 101 is transmitted by the mechanical linkage above described to the secondary brake shoe 102. In other words, when liquid is introduced under pressure into the wheel cylinder 104, the shoe 101 is forced into contact with the drum, and then tends to rotate counter-clockwise. The lower end of the brake shoe 101 then pushes the strut 122, its associated screw 120, and plunger 118 against the lever 114, tending to rotate the latter counter-clockwise about its pivot 112. It will be noted that as soon as there has been any rotation of the lever 114, the end 117 of the lever 115 breaks away from the lever 114, and all the force from lever 114 is applied to lever 115 through the free end 116 of the lever 114. Lever 115 is then rotated clockwise about its pivot 113, and applies a force against the inner end of the plunger 119, thereby pressing the lower end of the brake shoe 102 into contact with the brake drum. When the brake shoe 102 is pressed into contact with the brake drum at its lower end, it becomes a "self-energizing" shoe and acts in the same manner as the conventional shoe with its upper end anchored by any ordinary brake actuating mechanism.

It will be evident that due to the mechanical advantages of the two levers 114 and 115 that the force applied to the plunger 119 is considerably less than that applied to the plunger 118 by the brake pedal 101. By suitably proportioning the links 114 and 115, any desired ratio of forces can be obtained. The preferred ratio of forces is approximately 2¾ to 1. That is, for each 2¾ pounds of force exerted on plunger 118 but one pound is transmitted to the brake shoe 102.

Figure 14:
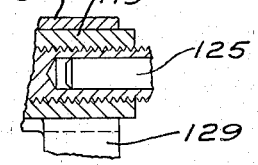
Figure 14 is a fragmentary sectional view of the structure shown in Figure 13 with the flange 119a omitted.

The modification just described is so designed that when the brake drum rotates clockwise, or in other words, when the vehicle on which it is used is reversing, the shoe 102 cannot exert a servo action on shoe 101. Flange 119a on the plunger 119 prevents that effect. It will be evident, however, that the flange 119a may be eliminated, as shown in Figure 14, allowing shoe 102 to act as a servo shoe if desired, for in this embodiment of the invention the force which would be derived by shoe 101 from shoe 102 when the drum rotates clockwise would be the same as that obtained by shoe 102 from shoe 101 when the drum rotates counter-clockwise. In that respect the device shown in Figures 10 to 13 would operate differently than the two previously described structures if not prevented from doing so by flange 119a.

From the foregoing it will be seen that the above described invention makes it possible to exactly equalize the pressures exerted on both brake shoes and yet allow the brake shoes to be so arranged that they are self-energizing when the brake drums are rotated in a forward direction. As a result, the brake lining of both shoes can be the same, and it is unnecessary to experiment with different kinds of brake linings in order to offset the excess pressure on the secondary shoe in conventional brake constructions. Also, the force exerted on the brake drum by the shoes is applied in such a way that there is no appreciable eccentricity of the drum.

The various modifications disclosed in this application are shown by way of illustration only. It will be evident, however, that various other changes may be made in the structure by those skilled in the art, and accordingly, the scope of the invention is to be limited only by the appended claims.

I claim:

1. A unitary brake shoe servo control comprising a tubular housing, a pair of plungers slidable axially of said housing, said plungers adapted to be connected at their remote ends to the respective adjacent ends of a pair of brake shoes, a pair of levers pivoted within said housing intermediate the adjacent ends of said plungers, each of said levers engaging the adjacent end of the complementary plunger intermediate the ends of the lever, the free end of one of said levers engaging the other lever at a point intermediate its pivot and its point of contact with its associated plunger whereby a predetermined portion of the effort applied to one of said plungers by its associated brake shoe is transmitted to the other plunger.

2. A unitary brake shoe servo control comprising a tubular housing, a pair of plungers within said housing, one of said plungers being slidable axially of said housing in either direction, and the other plunger being slidable in one direction only from its normal position, said plungers being adapted to be connected at their remote ends to the respective adjacent ends of a pair of brake shoes, and means intermediate the adjacent ends of the plungers for transmitting a predetermined portion of the effort applied to one of said plungers by its associated brake shoe to the other plunger.

3. A unitary brake shoe servo control adapted to be secured to the backing plate of a brake assembly between the adjacent ends of a pair of brake shoes, said control comprising a tubular housing, and mechanism within said housing adapted to be connected to the adjacent ends of the brake shoes for transmitting a part of the rotary thrust of one brake shoe to the other brake shoe, said mechanism including a pair of levers pivoted within the housing.

4. A brake assembly comprising a backing plate, primary and secondary brake shoes, brake applying means acting on the brake shoes at one side of the backing plate, and means at the other side of the backing plate for transmitting a part of the rotary thrust of the primary shoe to the secondary shoe, said means including a pair of levers contacting each other and pivotally connected to the backing plate.

5. A brake assembly comprising a backing plate, primary and secondary brake shoes, brake applying means acting on the brake shoes at one side of the backing plate, and means at the other side of the backing plate for transmitting a part of the rotary thrust of the primary shoe to the secondary shoe, said means including a pair of juxtaposed levers pivotally connected to the backing plate at their opposite ends, the free end of each lever engaging the other lever intermediate the ends of the latter.

6. A brake assembly comprising a backing plate, primary and secondary brake shoes, brake applying means acting on the brake shoes at one side of the backing plate, and means at the other side of the backing plate for transmitting a part of the rotary thrust of the primary shoe to the secondary shoe, said means including a pair of juxtaposed levers pivotally connected to the backing plate at their opposite ends, the free end of each lever engaging the other lever intermediate the ends of the latter, and plungers connected to the brake shoes and engaging the remote sides of the levers at points intermediate their ends.

7. A unitary brake shoe servo control comprising a tubular housing, a pair of plungers within said housing, one of said plungers being slidable axially of said housing in either direction, the other plunger having a radial flange at its outer end engageable with the adjacent end of the housing when the plunger is in its normal position, said plungers being adapted to be connected at their remote ends to the respective adjacent ends of a pair of brake shoes, and means intermediate the adjacent ends of the plungers for transmitting a predetermined portion of the effort applied to one of said plungers by its associated brake shoe to the other plunger.

GEORGE H. HUNT.